United States Patent [19]

Masino et al.

[11] Patent Number: 4,563,511
[45] Date of Patent: Jan. 7, 1986

[54] POLYOLEFIN POLYMERIZATION PROCESS AND CATALYST

[75] Inventors: Albert P. Masino; Kiplin D. Cowan, both of Bartlesville; Gil R. Hawley, Dewey, all of Okla.

[73] Assignee: Phillips Petroleum Company, Bartlesville, Okla.

[21] Appl. No.: 669,909

[22] Filed: Nov. 9, 1984

Related U.S. Application Data

[62] Division of Ser. No. 524,488, Aug. 19, 1983, Pat. No. 4,503,159.

[51] Int. Cl.$^4$ .......................... C08F 4/02; C08F 10/06
[52] U.S. Cl. .................................... 526/119; 526/138; 526/351
[58] Field of Search ......................................... 526/119

[56] References Cited

U.S. PATENT DOCUMENTS

| | | | |
|---|---|---|---|
| 3,277,069 | 10/1966 | Natta et al. | 526/141 |
| 4,315,874 | 2/1982 | Ushida et al. | 526/125 |
| 4,444,967 | 4/1984 | Arzoumanidis et al. | 526/141 |
| 4,477,588 | 10/1984 | Hawley | 526/119 |

Primary Examiner—Edward J. Smith
Attorney, Agent, or Firm—Edward L. Bowman

[57] ABSTRACT

An olefin polymerization catalyst prepared by reacting water with a magnesium dihalide in the presence of a phase transfer catalyst and reacting the resulting hydrated magnesium dihalide with reactants including a benzoic acid ester, an alkoxytitanium compound, an organoaluminum halide and a titanium halide.

20 Claims, No Drawings

POLYOLEFIN POLYMERIZATION PROCESS AND CATALYST

The present invention relates to the polymerization of olefins. In another aspect, this invention relates to novel catalysts useful for the polymerization of olefins. This U.S. application is a division of application Ser. No. 524,488, filed Aug. 19, 1983 now U.S. Pat. No. 4,503,159.

In U.S. Pat. No. 4,394,291 there is disclosed a number of new high activity polymerization catalysts. The disclosure of said application is hereby incorporated by reference. One of those catalyst types disclosed was prepared by reacting reactants comprising (a) a magnesium dihalide, (b) a benzoic acid ester, and (c) a titanium compound, such as an alkoxytitanium compound, to produce a first catalyst component, then reacting that component with a second catalyst component comprising a precipitating agent, and then reacting the resulting solid product with a halogenating agent, such as TiCl$_4$.

The catalysts of the examples in that application were prepared using commercially available "anhydrous" magnesium dichloride. The term "anhydrous" magnesium dichlorides as conventionally used is used to indicate magnesium chlorides having no more than about 1 mole of water per mole of magnesium dichloride. Typically, the level of water in commercially obtained "anhydrous" magnesium chloride is much lower than 1 mole per mole of magnesium chloride.

Two of the present inventors have found that the activity of such catalysts can be improved by insuring that the magnesium dihalides have certain specified amounts of water associated therewith.

It has subsequently been noted that the addition of water to a hydrocarbon dispersion of the magnesium dihalide is inefficient for producing catalyst for most commerical scale operations since it leads to the formation of large solid agglomerates. The formation of the large solid agglomerates results in inefficient reaction of the magnesium dihalide in the later steps of the catalyst preparation and thus to lower catalyst activity. The presence of the large agglomerates would also tend to cause plugging of the lines in which catalyst is generally transferred in modern commercial scale polymerization processes.

SUMMARY OF THE INVENTION

The present invention provides an improved catalyst, the method for its production, and the method for its use.

In accordance with the present invention, the catalyst is produced by mixing a magnesium dihalide and a small quantity of added water in a hydrocarbon solvent in the presence of a phase transfer agent and reacting the resulting hydrated magnesium dihalide with reactants comprising a benzoic acid ester and an alkoxytitanium compound to form a first catalyst component, and then reacting said first catalyst component with an organoaluminum halide to form a solid product, then reacting that solid product with a halogenating agent comprising a titanium halide, wherein the amount of water employed is such that the total moles of water including water originally associated with the magnesium dihalide is in the range of 0.5 to 1.5 times the number of moles of magnesium dihalide.

DETAILED DESCRIPTION OF THE INVENTION

The presently preferred magnesium dihalide is "anhydrous" magnesium dichloride. The greatest improvements are observed when the magnesium dichloride starting material contains less than 0.5 mole of water per mole of MgCl$_2$ and is substantially free of organic compounds. The level of water can be determined using routine analysis techniques. Typically, such techniques involve the use of Karl Fischer titration plus other conventional techniques such as X-ray diffraction and elemental analysis for determining whether there are significant amounts of other materials, particularly MgO, associated with the MgCl$_2$.

The alkoxytitanium compounds are those titanium compounds in which the titanium is bonded to at least one oxygen atom and the oxygen atom is bonded to at least one alkyl radical. The preferred alkoxytitanium compounds are those of the formula $$Ti(OR)_4$$

wherein each R is individually selected from an alkyl group containing 1 to 20 carbon atoms and each R can be the same or different. The most preferred are those in which each alkyl group contains 1 to 10 carbon atoms.

The molar ratio of the alkoxytitanium compound to the metal halide compound can be selected over a relatively broad range. Generally, the molar ratio of alkoxytitanium to magnesium dihalide is in the range of about 10/1 to 1/10, more preferably about 2/1 to 1/2.

The term benzoic acid ester is used generically to include substituted as well as unsubstituted benzoic acid esters. Typical examples include ethyl benzoate, ethyl p-methoxybenzoate, ethyl toluate, ethyl p-butoxybenzoate, and butyl benzoate. The preferred benzoic acid esters are those having 8 to 12 carbon atoms per molecule.

In an especially preferred embodiment, a phenol is employed in conjunction with the benzoic acid ester in making the first catalyst component. The term "phenol" is used herein to refer to substituted as well as unsubstituted phenols. Typical examples include phenol, o-methyl phenol, m-methyl phenol, p-methyl phenol, 4-phenyl phenol, o-fluorophenol, m-fluorophenol, p-fluorophenol, p-sec-butyl phenol, p-ethyl phenol, p-isopropyl phenol, p-tertbutyl phenol, p-methoxy phenol, p-cyanophenol, and p-nitrophenol.

The currently preferred combination of ester and phenol is 4-phenyl phenol and ethyl benzoate. The total number of moles of 4-phenyl phenol and ethyl benzoate employed can affect the activity and selectivity of the resulting catalyst. Typically, the ratio of the sum of the moles of those two electron donors to the moles of the titanium alkoxide are in the range of about 5/1 to 1/5, more preferably 3/1 to 2/1. Most preferably, ½ mole of ethyl benzoate is employed per mole of titanium alkoxide.

Any of the known phase transfer catalysts should be suitable for use in the present invention. Such phase transfer agents are those materials which have been found to assist in the reaction between reactants which are located in different liquid phases of differing polarity. Typical examples include the quaternary salts and macrocyclic polyether compounds.

Macrocyclic polyethers are described in U.S. Pat. No. 3,987,061, the disclosure of which is incorporated herein by reference. The term refers to those cyclic polyether compounds having 15 to 60 atoms in the polyether ring. The preferred are crown ethers from the 15-crown-5 and 18-crown-6 series.

The currently preferred phase transfer agent is of the quaternary salt type. Such are disclosed in U.S. Pat. No. 3,992,432, the disclosure of which is incorporated herein by reference. Examples of the preferred quaternary salts can be expressed by the formula $$(R_1R_2R_3R_4M)^+X^-$$

where $R_1$, $R_2$, $R_3$, and $R_4$ are the same or different monovalent hydrocarbon radicals selected from among alkyl, alkenyl, aryl, alkaryl, aralkyl and cycloalkyl radicals containing from 1 to about 25 carbon atoms per molecule such that the total number of carbon atoms ranges from about 15 to 25 or more. M is selected from among nitrogen, phosphorus, antimony and bismuth, more preferably nitrogen and phosphorus and most preferably nitrogen. X is a halogen atom, preferably chlorine although bromine and iodine can be used in some instances. Mixtures of quaternary salts can be employed, if desired. Specific examples of suitable quaternary salts include:
ethylhexadecyldimethylammonium chloride
tetra-n-butylammonium chloride, presently preferred
benzyldimethyloctadecylammonium chloride
didodecyldimethylammonium chloride
dodecyltrimethylammonium chloride
hexadecyltrihexylammonium bromide
tetraheptylammonium iodide
tridecylbenzylammonium chloride
tri-n-butyldecylphosphonium iodide
tetra-n-butylphosphonium chloride
triphenyldecylphosphonium iodide
trioctyldodecylstibonium chloride
diheptylmethyldecylbismuth chloride, and the like.

The phase transfer agent and the added water can be mixed with the magnesium dihalide in any suitable manner. It is theorized that the use of the phase transfer agent allows the added water to be better dispersed as smaller droplets throughout the hydrocarbon and that this contributes to the formation of smaller particles of hydrated $MgCl_2$. For best results, the magnesium dihalide should not be mixed with the water until phase transfer agent is also present. One technique involves premixing the water and the phase transfer agent, optionally in the presence of additional hydrocarbon and then adding the mixture to a hydrocarbon slurry of the magnesium dihalide. Another less preferred technique involves adding the water and the phase transfer agent separately but simultaneously to a hydrocarbon dispersion of the magnesium dihalide. Still another technique involves premixing the water, phase transfer agent, and hydrocarbon and then adding the dihalide to the mixture.

The phase transfer agent can be employed in any amount that provides a reduction in the formation of agglomerates in the catalyst preparation. The quantity is generally related to the amount of added water that is to be used in the process. Typically, the phase transfer agent is employed in such an amount that the molar ratio of added water to phase transfer agent is in the range of about 20/1 to about 20,000/1, and more preferably about 50/1 to about 5,000/1. For a more specific example, when tetra-n-butyl-ammonium chloride is used as the phase transfer agent, the mixture of water and phase transfer agent generally would contain about 0.03 to about 44 weight percent of the phase transfer agent, or more generally about 0.08 to about 24 weight percent.

The formation of the first catalyst component is conducted by reacting the resulting hydrated magnesium dihalide with the titanium compound and a benzoic acid ester, and optionally and preferably with a phenol. The reaction is conducted in a suitable hydrocarbon solvent or diluent substantially free of free water. Examples include n-pentane, n-heptane, methylcyclohexane, toluene, xylenes, and the like. The amount of solvent or diluent can be selected over a broad range. Usually the amount of solvent or diluent would be within the range of about 20 to about 100 cc per gram of metal dihalide.

Generally, it is preferred to combine the hydrated magnesium dihalide and the titanium compound at a temperature in the range of about 0° C. to about 50° C., more preferably about 10° C. to about 30° C. The reaction between the reactants of the first catalyst component is carried out at a temperature in the range of about 15° C. to about 150° C. Typically, the reaction is carried out by refluxing the mixture.

While it is not absolutely critical, it is currently preferred to mix the magnesium dihalide and the titanium compound and optionally the phenol at a temperature in the range of 20° C. to 40° C., then to heat the mixture to 90°–100° C. for a few minutes, and then to add the ester at that temperature and maintain the mixture at a temperature of about 90°–100° C. to complete the reaction.

Generally, the time required for heating the reactants to make the first catalyst component is within the range of about 5 minutes to about 10 hours, although in most instances a time within the range of about 15 minutes to 3 hours is sufficient.

The reaction of the organoaluminum halide with the first catalyst component can be carried out by merely adding the organoaluminum halide to a solution of the first component. It is, however, currently preferred to add a hydrocarbon solution of the halide to the first component solution.

The temperature employed for reacting the second catalyst component, i.e., the organoaluminum halide, and the first catalyst component can be selected over a broad range. Generally, the temperature employed is within a range of about 0° C. to about 50° C. or higher, while temperatures within the range of 20° C. to about 30° C. were most often employed. Since heat is evolved when the first catalyst component and the second catalyst component are mixed, the mixing rate is adjusted as required and additional cooling is employed in order to maintain a relatively constant mixing temperature. It is noted with respect to mixing the first and second components that the order of addition is not important and either component can be added to the other. However, it is preferable to add the second component to the first. After completing the mixing, the resulting slurry is stirred or agitated for a sufficient time, generally within a range of about 15 minutes to about 5 hours to insure that mixing of the components is complete. Thereafter, stirring is discontinued and the solid product recovered by filtration, decantation, and the like. The product is then washed with a suitable material such as a hydrocarbon, e.g., n-pentane, n-heptane, cyclohexane, benzene, xylenes, and the like, to remove any soluble material which may be present. The product is then dried and stored under dry nitrogen.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active olefin polymerization catalyst.

Generally, the reaction between solid product resulting from the reaction of the first and second components with the halide ion exchanging source can be carried out neat or in a liquid medium in which the halide ion exchanging source is soluble. The product from step (2) is generally in a liquid diluent when contacted with the halide ion exchanging source. Any suitable diluent can be employed. Examples include normally liquid hydrocarbon such as n-pentane, n-heptane, cyclohexane, benzene, and xylene.

The temperature employed in step (3) can be selected over a relatively broad range, generally in the range of −25° C. to +250° C., preferably 0° C. to 200° C., with temperatures of 100° C. being most preferred.

The treating time can also be selected over a broad range and generally is within the range of about 10 minutes to about 10 hours. While the weight ratio of the halide ion exchanging source to the product of step (2) can be selected over a realtively broad range, the weight ratio of the halide ion exchanging source to the product of step (2) is generally within a range of about 10:1 to about 1:10 and more generally from about 7:1 to about 1:4. Following the treatment of the product of step (2) with the halide ion exchanging source the surplus halide ion exchanging source is removed by washing the solid catalyst with a dry (essential absence of water) liquid such as a hydrocarbon of the type previously disclosed, n-hexane, or xylene, for example. The resulting catalyst, after drying, is stored under dry nitrogen.

The currently preferred titanium halide for use as the halide ion exchanging source is $TiCl_4$. In an especially preferred embodiment, the $TiCl_4$ is employed in conjunction with a halide of silicon such as $HSiCl_3$ and/or $SiCl_4$.

The catalyst of the present invention can be used in the polymerization of olefins. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process, a gas phase process, or a solution form process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from about 8 to about 14 carbon atoms per moelcule, and include, for example, styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

The inventive catalysts are particularly well suited for producing stereoregular polypropylene, many offering potential for high rates as well as low soluble polymer formation.

Polymerization may be conducted in a liquid phase, in the presence or absence of an inert hydrocarbon diluent, or in a gas phase. In the polymerization of propylene, particularly satisfactory results have been attained operating in the presence of an aliphatic or aromatic hydrocarbon diluent, liquid under the polymerization conditions, such as propylene, toluene, gasoline, and the like.

While it may not be necessary in all instances to employ a cocatalyst with the catalyst of the present invention, the use of cocatalysts is recommended for best results. The organometallic cocatalysts suitable for use in accordance with the invention can be selected from among the hydrides and organometallic compounds of metals of Groups IA, II and IIIA of the Periodic Table. Of the organometallic cocatalysts, organoalumium compounds such as those described above as suitable for use as the second component of the catalyst, are preferred with the most preferred organoaluminum cocatalysts being compounds of the formula $R_3Al$ which include, for example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transistion metal compound of the first catalyst component is within a range of about 1:1 to about 1500:1. For catalyst systems wherein the cocatalyst comprises at least one organoaluminum compound typically there is employed about 0.25 to 15 milligrams of the titanium-containing component per mmole of organoaluminum cocatalyst.

The catalyst is preferably used with a multicomponent cocatalyst system comprising triethylaluminum (TEA), an aromatic ester such as ethyl anisate (EA), ethyl benzoate (EB), methyl-p-toluate (MPT), etc., and diethylaluminum chloride. Best selectivity (stereospecificity) is obtained when the TEA:ester mole ratio is about 2:1. The DEAC, when used, helps in increasing activity. Generally, a TEA:ester:DEAC mole ratio ranging from about 2:1:0.5–3 and preferably about 2:1:2 is employed in bench scale testing for batch polymerization. For a continuous, larger scale process, it becomes possible, for example, when using TEA and MPT to use TEA:MPT mole ratios of about 3:1 to about 5:1 and dispense with the DEAC entirely. A decreased DEAC level is desirable when employing a flash process to recover polymer since the amount of chloride remaining in the polymer is dependent to some extent on the DEAC level.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed, either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the monomer is then admitted and maintained at a partial pressure within a range of about 0.5 MPa to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reactor product is continuously withdrawn and the polymer recovered as appropriate, generally by flashing the diluent (solvent) and unreacted monomers and drying the resulting polymer.

For optimum productivity of polymer of low solubility in the continuous polymerization of propylene preferably the cocatalyst comprising the trialkylaluminum-electron donor is contacted with the titanium-containing catalyst prior to being exposed to liquid propylene.

The olefin polymers made with the catalysts of this invention are useful in preparing articles by conventional polyolefin processing techniques such as injection molding, rotational molding, extrusion of film, and the like.

A further understanding of the present invention and its advantages will be provided by the following examples.

EXAMPLE 1

Polymerization Catalyst Production

A typical polymerization catalyst preparation is shown below wherein the $MgCl_2$ source contains less than about 0.1 mole water per mole $MgCl_2$ and sufficient free water admixed with tetra-n-butylammonium chloride (TBAC) is used to provide a partly hydrated $MgCl_2$, e.g. $MgCl_2 \cdot H_2O$ as a reactant.

A 30 gal (113 L) Pfaudler reactor was charged with 7.2 gal (27 L) of dry mixed xylenes (commercially available) and 951.6 g of $MgCl_2$, containing 1.6 weight percent water, previously screened through a 30 mesh sieve (U.S. Sieve Series). The $MgCl_2$ used corresponds to the calculated composition $MgCl_2 \cdot 0.09\ H_2O$. The calculated amount of water present. $951.6 \times 0.016$, is 15.2 g (0.84 mole). The calculated amount of anhydrous $MgCl_2$, $951.6 \times 0.984$, is 936.4 g (9.84 mole). While stirring the mixture at about 25° C., a second mixture consisting of 180 mL (10 moles) of water and 8.4 g (0.030 mole) of TBAC is added over 12 minutes. The total available water is then calculated to be 10.84 moles. The calculated mole ratio of added free water to TBAC is 333:1 and the calculated mole ratio of total water to TBAC is 357:1. The resulting stirred mixture was heated for 90 minutes at 40°–50° C. Reactor and contents were cooled to about 30°–35° C. and 1248.7 g (7.34 moles) of 4-phenylphenol (4-PP) and 3.8 lbs (5.06 moles) of titanium tetra-n-butoxide [$Ti(OBu)_4$] were added. The mixture was heated to 90°–100° C. for 15 minutes, 0.8 lbs (2.42 moles) of ethyl benzoate (EB) was added and the stirred mixture heated an additional 45 minutes at 90°–100° C. The reactor and contents were cooled to about 50° C. and over a 61 minute period was added 10.4 lbs of ethylaluminum sesquichloride (4.78 moles) as a 25 weight percent solution in n-heptane. The mixture was stirred an additional 45 minutes, cooled to about 30° C., 5 gal (19 L) of n-hexane was added and stirring discontinued. The solids were allowed to settle and the mother liquor decanted. The solids were washed 4 times using 15 gal (57 L) of n-hexane per wash, decanting wash liquor in each instance. To the washed solids was added 32.0 lbs (14.5 kg) of a mixture produced by admixing 105.6 lbs (47.9 kg) of $TiCl_4$, 61.2 lbs (27.8 kg) of $HSiCl_3$ and 27.6 lbs (12.5 kg) of $SiCl_4$. The mixture is calculated to be 54.3 wt. % (47.5 mole %) $TiCl_4$, 31.5 wt. % (38.6 mole %) $HSiCl_3$ and 14.2 wt. % (13.9 mole %) $SiCl_4$.

The mixture was heated to 90°–100° C. for 1 hour while stirring, cooled to about 30° C., 5 gal of n-hexane was added and stirring was discontinued. The catalyst solids were allowed to settle and the liquor was decanted. The solids were washed 6 times with 15 gal portions of n-hexane as before and transferred to a receiver for storage.

A series of catalysts was prepared in the general manner described above from $MgCl_2$ containing no more than about 0.1 mole water per mole $MgCl_2$ and adding sufficient free water along with variable amounts of TBAC so that $MgCl_2$ associated with about 0.9 to 1.25 moles $H_2O$ was formed as a reactant.

A sample from most of the catalysts prepared was analyzed for the Ti, Mg, Cl and Al content.

The moles of free water added per mole of initial $MgCl_2$ used, the moles of free water per mole of TBAC employed and the elemental compositions of the catalysts made are set forth in Table 1.

TABLE 1

| | Polymerization Catalysts | | | | | |
|---|---|---|---|---|---|---|
| Catalyst | Moles H₂O Per Mole | | Weight Percent | | | |
| No. | $MgCl_2$ | TBAC | Ti | Mg | Cl | Al |
| A | 1.0 | 250 | 6.1 | 14.8 | 59.2 | 0.3 |
| B | 1.25 | 312 | 2.5 | 14.5 | 50.6 | 1.8 |
| C | 1.0 | 333 | 7.2 | 14.3 | 60.0 | 0.3 |
| D | 1.0 | 500 | 7.3 | 13.1 | 55.1 | 0.6 |
| E | 1.0 | 1540 | 5.0 | 15.2 | 55.2 | 1.8 |
| F[1] | 1.1 | 0 | —[2] | — | — | — |

[1]Comparison catalysts prepared in the manner described for invention catalysts employing free water but no phase transfer catalyst.
[2]A dash signifies no determination was made.

Comparison catalyst F formed relatively large agglomerates, e.g. marble-size lumps, during its production resulting in a plugged transfer line when an attempt was made to move it from the Pfaudler reactor to a storage vessel.

EXAMPLE II

Propylene Polymerization

A sample of the catalyst was tested in propylene polymerization for 1 hour at 70° C. by employing a liquid full, 3.8 liter stirred stainless steel reactor in the presence of the specified cocatalyst system and hydrogen, if used. A typical cocatalyst system, for example, can consist of a premixed composition containing about 7.54 mmoles triethylaluminum (TEA) and 3.76 mmole methyl p-toluate (MPT) which is used in combination with 7.54 mmoles of diethylaluminum chloride (DEAC). The resulting mole ratio of TEA:MPT:DEAC is about 2:1:2.

Prior to each run, the reactor is conditioned by filling it about ½ full with n-hexane dried with alumina and then heating reactor and contents with stirring for about 10–15 minutes at over 100° C., e.g. 135° C. Heating and stirring are discontinued, the reactor contents are drained, the reactor is flushed with dry nitrogen and then with propylene vapor.

While continuing the propylene purge, through an entry port is the reactor is charged to order, the TEA.MPT mixture, the solid catalyst, the DEAC and hydrogen, if used. The port is sealed and 3 liters of liquid propylene is added to the reactor. The hydrogen can be added from a pressurized container of known volume in terms of pressure drop, e.g. 10 psi. Heating is started. When the desired reactor temperature is reached, e.g. 70° C., the reactor is filled liquid full with propylene and maintained liquid full during the run by means of a propylene reservoir open to the reactor overpressured with dry nitrogen, e.g. about 515 psia (3.55 MPa).

Each run is terminated by discontinuing the propylene feed, pressuring in about 5 mL methanol with nitrogen, and cooling the reactor to about 30° C. Stirring is discontinued and the liquid propylene is drained from the reactor into a dry, tared container. The reactor is filled with fresh propylene and the contents are stirred several minutes to wash the polymer. The wash propylene is then discharged to the tared container.

The polymer in the reactor is recovered, dried if necessary, to remove volatile hydrocarbons and weighed to determine the yield. The polymer can be stabilized by slurrying it in an acetone solution containing a conventional antioxidant system for polypropylene and the solvent removed by heating the mixture for about 3 hours at 60° C. in a vacuum oven.

Propylene-soluble polymer contained in the propylene in the tared vessel is determined by heating the vessel to dryness in a vacuum oven at about 60° C. The vessel is then weighed to ascertain the weight of residue remaining. Xylene-soluble polymer, calculated productivity of the solid catalyst, and other physical properties of the polymer, if specified, are determined as disclosed in the aforementioned Ser. No. 240,533 now U.S. Pat. No. 4,394,291.

The results obtained are presented in Table II.

TABLE II

| | | | Propylene Polymerization At 70° C. | | | | | | |
|---|---|---|---|---|---|---|---|---|---|
| | Catalyst | | Polymer Yield, g | | Solid[a] Catalyst | Polymer | | Wt. % Solubles | |
| Run No. | No. | Wt. mg | Propylene Soluble | Propylene Insoluble | Productivity kg/g cat/hr | Flex Mod MPa | Melt Flow g/10 min | Propylene | Xylene | Total |
| 1 | A | 27.4 | 5.2 | 409 | 14.9 | 1700 | 4.9 | 1.3 | 1.5 | 2.8 |
| 2 | B | 32.4 | 3.8 | 328 | 10.1 | 1580 | 1.8 | 1.1 | 1.5 | 2.6 |
| 3 | C | 31.8 | 3.9 | 344 | 10.8 | 1790 | —[b] | 1.1 | 1.4 | 2.5 |
| 4 | D | 23.5 | 4.7 | 310 | 13.2 | 1690 | 3.8 | 1.5 | 1.4 | 2.9 |
| 5 | E | 33.7 | 3.3 | 273 | 8.1 | 1690 | 5.9 | 1.2 | 1.9 | 3.1 |
| 6[c] | F | 14.7 | 3.0 | 105 | 7.1 | — | 5.9 | 2.8 | 5.0 | 7.8 |

[a]Based on propylene insoluble polymer.
[b]A dash signifies no determination.
[c]Comparison run.

Active, sterospecific catalysts are employed in all the runs shown above, including comparison run 6. However, the data obtained in invention runs 1–5, based on productivity values ranging from about 8 to 15 kg polymer per g solid catalyst per hour and total solubles ranging from about 2.5 to 3 weight percent, relative to the lower productivity and higher solubles values in comparison run 6, demonstrate the superior results obtained for the invention catalysts.

What is claimed is:

1. A process for the polymerization of an alpha olefin comprising contacting said alpha olefin under polymerization conditions with a catalyst prepared by mixing a magnesium dihalide and a small quantity of added water in a hydrocarbon solvent in the presence of a phase transfer agent and reacting the resulting hydrated magnesium dihalide with reactants comprising a benzoic acid ester and an alkoxytitanium compound to form a first catalyst component, and then reacting said first catalyst component with an organoaluminum halide to form a solid product, then reacting said solid product with a halogenating agent comprising a titanium halide, wherein the amount of added water employed is such that the total moles of water including water originally associated with the magnesium dihalide is in the range of 0.5 to 1.5 times the number of moles of magnesium dihalide.

2. A process according to claim 1 wherein the phase transfer agent is employed in such an amount that the molar ratio of added water to phase transfer agent is in the range of about 20/1 to about 20,000/1.

3. A process according to claim 2 wherein said phase transfer agent is a quaternary salt of the formula

$(R_1R_2R_3R_4M)^+X^-$ where $R_1$, $R_2$, $R_3$, and $R_4$ are the same or different monovalent hydrocarbon radicals selected from among alkyl, alkenyl, aryl, alkaryl, aralkyl and cycloalkyl radicals containing 1 to 25 carbon atoms per radical, M is selected from N, P, Sb and Bi, the total number of carbon atoms is in the range of 15 to 28, and X is a halogen atom.

4. A process according to claim 3 wherein said phase transfer agent is a quaternary ammonium halide.

5. A process according to claim 4 wherein said magnesium dihalide comprises magnesium dichloride, said alkoxytitanium compound comprises a compound of the formula Ti(OR)$_4$ wherein each R is individually selected from alkyl groups containing 1 to 20 carbon atoms, and wherein said organoaluminum halide comprises ethyl aluminum sesquichloride.

6. A process according to claim 5 wherein a phenol is also employed in the production of said first catalyst component.

7. A process according to claim 6 wherein said ester comprises ethyl benzoate and said phenol comprises 4-phenylphenol.

8. A process according to claim 7 wherein said halogenating agent comprises titanium tetrachloride, HSiCl$_3$, and SiCl$_4$.

9. A process according to claim 8 wherein the respective molar ratios of TiCl$_4$, HSiCl$_3$, and SiCl$_4$ is about 4/3.3/1.

10. A process according to claim 9 wherein said phase transfer agent is added to the water and the resulting mixture is added to a hydrocarbon containing MgCl$_2$.

11. A process according to claim 5 wherein polypropylene is produced.

12. A process according to claim 11 wherein said catalyst is prepared from magnesium dichloride, titanium tetra-n-butoxide, 4-phenyl phenol, ethyl benzoate, ethyl aluminum sesquichloride, and a mixture of TiCl$_4$, HSiCl$_3$, and SiCl$_4$.

13. A process according to claim 12 wherein said phase transfer agent is tetrabutyl ammonium chloride.

14. A process according to claim 6 wherein said phase transfer agent is tetrabutyl ammonium chloride.

15. A process according to claim 1 wherein said catalyst is employed in conjunction with a cocatalyst selected from the hydrides and organometallic compounds of metals of Groups IA, II, and IIIA.

16. A process according to claim 15 wherein said cocatalyst comprises a trialkyl aluminum.

17. A process according to claim 16, wherein the molar ratio of the cocatalyst to the transition metal compound of the first catalyst component is within the range of about 1/1 to about 1500/1.

18. A process according to claim 17 wherein said cocatalyst triethyl aluminum.

19. A process according to claim 18 wherein said cocatalyst further comprises an aromatic ester and diethylaluminum chloride.

20. A process for the polymerization of an alpha olefin comprising contacting said alpha olefin under polymerization conditions with a catalyst prepared by mixing a magnesium dihalide and a small quantity of added water in a hydrocarbon solvent in the presence of a phase transfer agent and reacting the resulting hydrated magnesium dihalide with reactants comprising a benzoic acid ester and an alkoxytitanium compound to form a first catalyst component solution, and then reacting said first catalyst component solution with an organoaluminum halide to form a solid product, then reacting said solid product with a halogenating agent comprising a titanium halide, wherein the amount of added water employed is such that the total moles of water including water originally associated with the magnesium dihalide is in the range of 0.5 to 1.5 times the number of moles of magnesium dihalide, said catalyst being employed in conjunction with a cocatalyst selected from the hydrides and organometallic compounds of Groups IA, II and IIIA.

* * * * *